United States Patent
Mann (10) Patent No.: US 8,897,755 B2
(45) Date of Patent: Nov. 25, 2014

(54) METHOD AND SYSTEM FOR DATE TRANSFER FROM A CELLULAR COMMUNICATIONS-DEVICE APPLICATION TO A TELECOMMUNICATIONS NETWORK

(75) Inventor: James M. Mann, Cypress, TX (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 13/259,103

(22) PCT Filed: Jul. 23, 2009

(86) PCT No.: PCT/US2009/051602
§ 371 (c)(1),
(2), (4) Date: Sep. 22, 2011

(87) PCT Pub. No.: WO2011/011010
PCT Pub. Date: Jan. 27, 2011

(65) Prior Publication Data
US 2012/0015637 A1    Jan. 19, 2012

(51) Int. Cl.
*H04M 3/42*    (2006.01)
*H04M 1/725*   (2006.01)

(52) U.S. Cl.
CPC ...... *H04M 1/72519* (2013.01); *H04M 2250/62* (2013.01); *H04M 1/72566* (2013.01)
USPC ............. 455/414.1; 455/418; 455/550.1

(58) Field of Classification Search
CPC ........... H04W 4/16; H04W 4/18; H04W 4/00; H04W 4/001; H04W 4/003; H04W 4/005
USPC ............ 455/414.1–414.3, 418, 550.1, 556.2
See application file for complete search history.

(56) References Cited

U.S. PATENT DOCUMENTS

| | | | |
|---|---|---|---|
| 7,277,921 B2 | 10/2007 | Nelson et al. | |
| 7,469,140 B1 | 12/2008 | Papineau | |
| 7,552,332 B2 | 6/2009 | Singh et al. | |
| 8,346,231 B1 * | 1/2013 | Smith et al. | 455/416 |
| 2007/0049261 A1 | 3/2007 | Joglekar | |
| 2008/0080692 A1 | 4/2008 | Sylvain | |

FOREIGN PATENT DOCUMENTS

| | | |
|---|---|---|
| CN | 101119506 A | 2/2008 |
| CN | 101291360 A | 10/2008 |
| KR | 10-2005-0073970 A | 7/2005 |

OTHER PUBLICATIONS

International Search Report and Written Opinion for PCT Application No. PCT/US2009/051602, mailed Apr. 19, 2010, pp. 10.

* cited by examiner

*Primary Examiner* — Marcos Torres
(74) *Attorney, Agent, or Firm* — Fulbright & Jaworski LLP (57) ABSTRACT

Embodiments of the present invention are directed to an information-transfer system that operates within a cell phone. The information-transfer system includes a data-transfer application that, prior to displaying a user interface with a call feature that allows a user to invoke a cell-phone application to place a phone call, places information to transfer to the cell-phone application in an information block for transfer to the cell-phone application. The information-transfer system further includes the cell-phone application, which receives the information block, extracts, from the information block, data for transfer to a telecommunications network, and transfers the extracted data to the telecommunications network.

12 Claims, 11 Drawing Sheets

METHOD AND SYSTEM FOR DATE TRANSFER FROM A CELLULAR COMMUNICATIONS-DEVICE APPLICATION TO A TELECOMMUNICATIONS NETWORK

BACKGROUND OF THE INVENTION

Cell phones, and other mobile electronic devices, represent an enormous market segment within the consumer electronics marketplace. Cell phones, once expensive devices used by a very small number of professionals, are seemingly indispensible and ubiquitous consumer appliances. Cell phones and other mobile electronic devices are rapidly evolving, from a technical and scientific standpoint, providing increasing computational bandwidth and rapidly expanding feature sets to consumers. Cell phone is not only used for wireless telecommunications, but also for Internet access, gaming, digital photography, personal electronic assistance, and for a variety of other functions and services. As the number of different applications and features provided by cell phones expands, designers, developers, and vendors of cell phones and other mobile electronic devices continue to seek new methods and systems for facilitating simple, intuitive, and time-efficient interaction by cell-phone users with multiple, concurrently-executing applications and multiple user interfaces.

DETAILED DESCRIPTION OF THE INVENTION

Embodiments of the present invention are directed to facilitating user interaction with multiple, concurrently-executing applications on a mobile electronic device, such as a cell phone. The discussion, below, is directed to embodiments of the present invention that provided extended memory to cell phones, but method and system embodiments of the present invention may be incorporated into additional types of mobile electronic devices. An overview of cell phones and telecommunications systems is first provided, below, followed by a discussion of embodiments of the present invention.

Overview of Cell Phones and Telecommunications Systems

Figure 1:
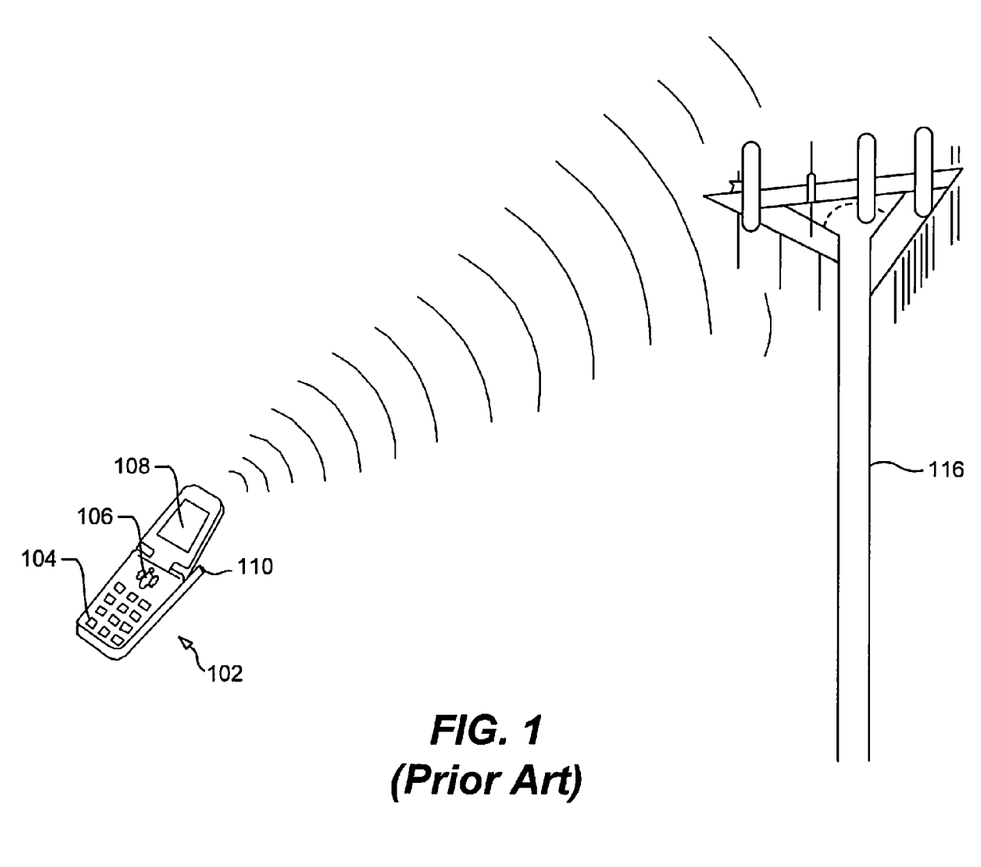
FIG. 1 illustrates a cell phone and cellular radio tower.
Figure 2:
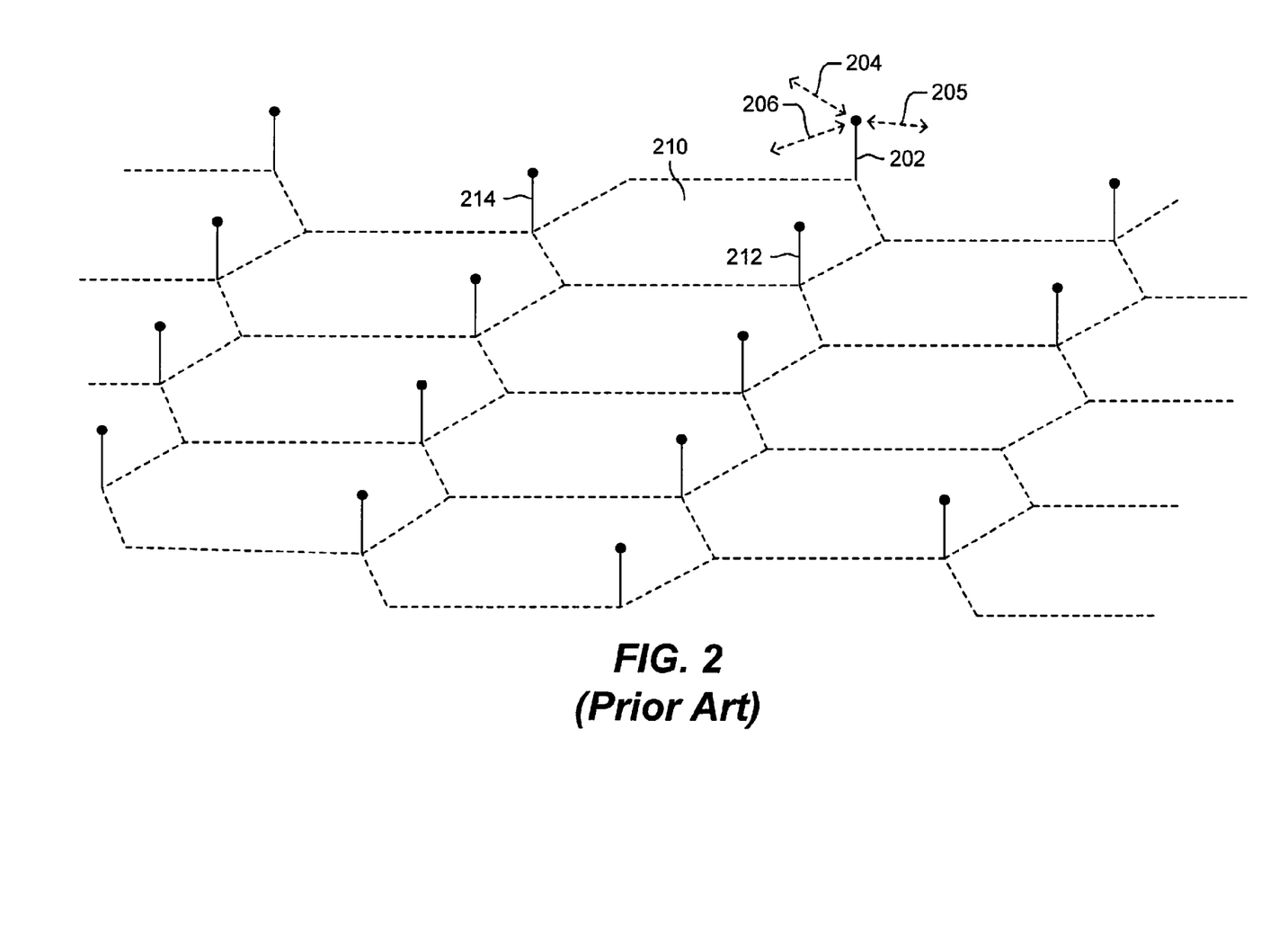
FIG. 2 illustrates partitioning of a geographical region into cells.

FIG. 1 illustrates a cell phone and cellular radio tower. The cell phone 102 is generally a compact, hand-held device that includes alphanumeric-character input keys, such as key 104, for input of numeric and text-character data, various control keys 106, for navigation through user-interface displays and menus, an LCD display 108, and a radio-frequency antenna 110. The cell phone broadcasts radio-frequency signals to, and receives radio-frequency signals from, one or more local cellular radio towers 116. The radio-frequency signals are multiplexed by frequency-division-multiple-access ("FDMA") or code-division-multiple-access ("CDMA") multiplexing to allow many cell telephones to broadcast and receive signals from multiple cellular radio towers within a local geographical area. The word "cell" in the phrase "cell phone" and the word "cellular" in the phrases "cellular network" and "cellular radio tower" refers to the partitioning of a geographical region into generally hexagonally-shaped sub-regions, referred to as "cells," by the locations and directional broadcast characteristics of a number of cellular radio towers. FIG. 2 illustrates partitioning of a geographical region into cells. In FIG. 2, a large number of cellular radio towers are depicted as vertical line segments capped with a small disk, such as vertical line segment 202. Each cellular radio tower generally includes a three-sided, or triangular, antenna mount that allows for broadcast and reception or radio signals roughly aligned with three directional, co-planar axes separated from one another by 120°, such as the three axes 204-206 shown for cellular radio tower 202. The geographical region is subdivided into hexagonal cells, indicated in FIG. 2 by dashed lines. Hexagonal cell 210 is served by cellular radio towers 202, 212, and 214, each with a directional broadcast axis directed towards the center of the cell. A cell-telephone user may walk or drive from one cell to another, and the network of cellular radio towers, associated base stations connected to a complex telecommunications network, allows the telecommunications network to transfer the mobile-electronic device, in real time, from broadcasting and receiving signals from the cellular radio towers associated with one cell to those associated with another, without interruption in an on-going phone call or electronic data-exchange operation.

There are a variety of different types of mobile telecommunications systems. One common mobile telecommunications system is referred to as the "universal mobile telecommunication system" ("UMTS"), one of several third-generation ("3G") mobile telecommunications technologies. The UMTS system supports data transfer rates up to 21 Mbit/second, although, with current handsets, maximum data-transfer rates generally do not exceed 7.2 Mbit/second. UMTS systems provide for cells of varying sizes, depending on population density, presence of buildings and other obstacles, and other considerations. In rural areas, cellular telephone towers may be separated by distances greater than 30 miles, while, in certain urban environments, a cell may span a single floor of a building.

Figure 3:
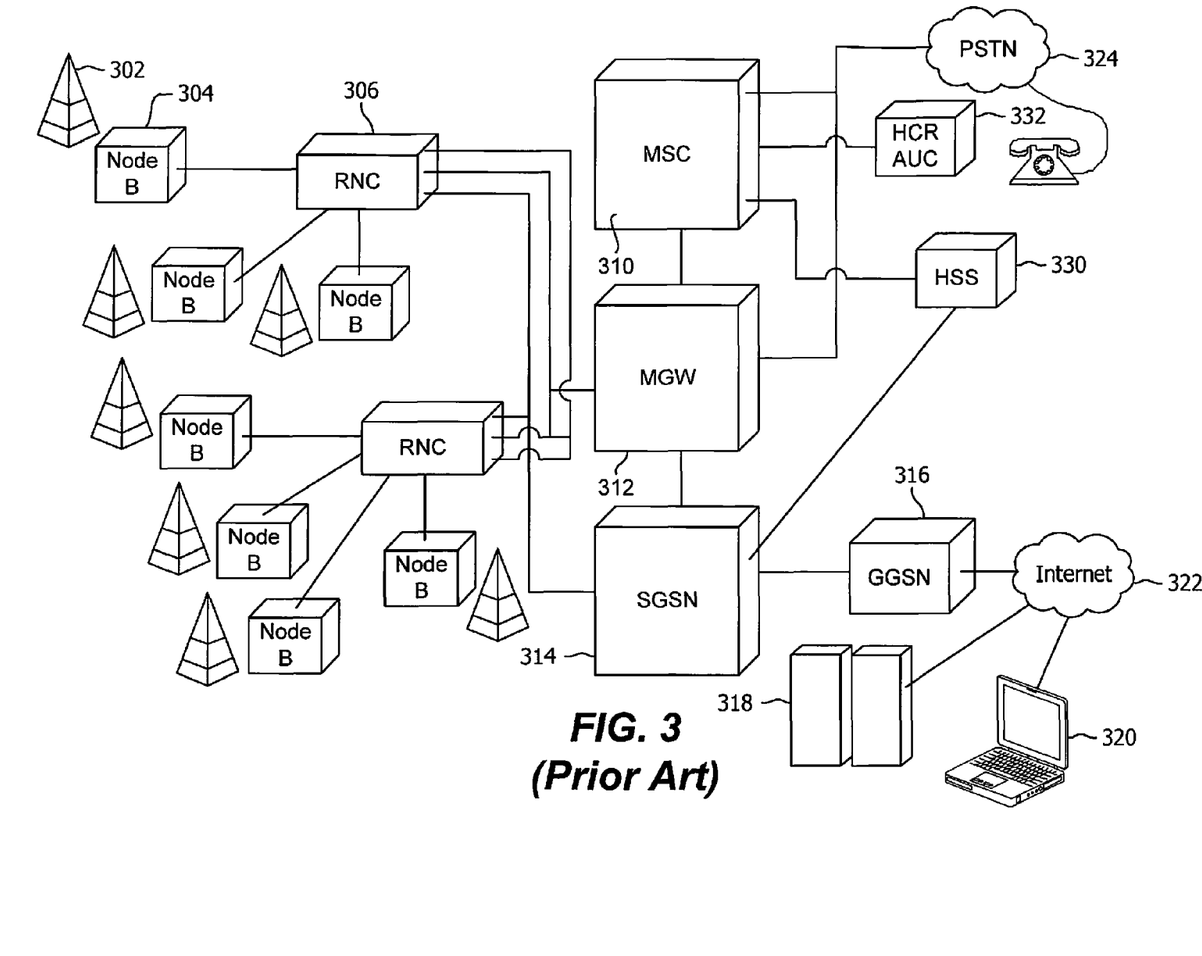
FIG. 3 illustrates certain of the components of a 3G telecommunications network.

FIG. 3 illustrates certain of the components of a 3G telecommunications network. In FIG. 3, cellular telephone towers and other antennas are indicated by antenna-like symbols, such as antenna-like symbol 302. Each cellular radio tower, or other antenna, is associated with a Node B base station, such as Node B base station 304 with which antenna 302 is associated. A single Node B base station may be associated with multiple antennas or cellular radio towers. The base stations include power amplifiers, digital-signal processors, and back-up batteries, and are generally responsible for broadcasting signals received by the base station from the cellular network to cell phones within the geographical area serviced by the base station and for forwarding signals received from cell phones to the cellular network. Base stations are directly connected to radio network controllers ("RNC"), such as RNC 306 in FIG. 3. Each RNC may be connected to multiple base stations. The RNCs are, in turn, connected to various components of the core cellular network, including a mobile switching center ("MSC") 310, a media gateway ("MGW") 312, and a serving GPRS support node ("SGSN") 314, the acronym "GPRS" standing for "general packet radio service." The SGSN 314 interconnects RNCs, via gateway GPRS support nodes ("GGSN") 316, to remote computing systems 318 and 320 via the Internet 322. The MSC 310 interconnects RNCs with a public switched telecommunications network ("PSTN") 324. The MGW 312 is concerned with data transfer in both circuit-based switch networks, such as PSTN, as well as in packet-based switch networks, such as the Internet, and is controlled by SGSNs and MSCs. Many additional components are included in the core telecommunications network, including a home-subscriber-server facility 330, home-location-register and authentication center 332, and many additional components and nodes not shown in FIG. 3.

Figure 4:
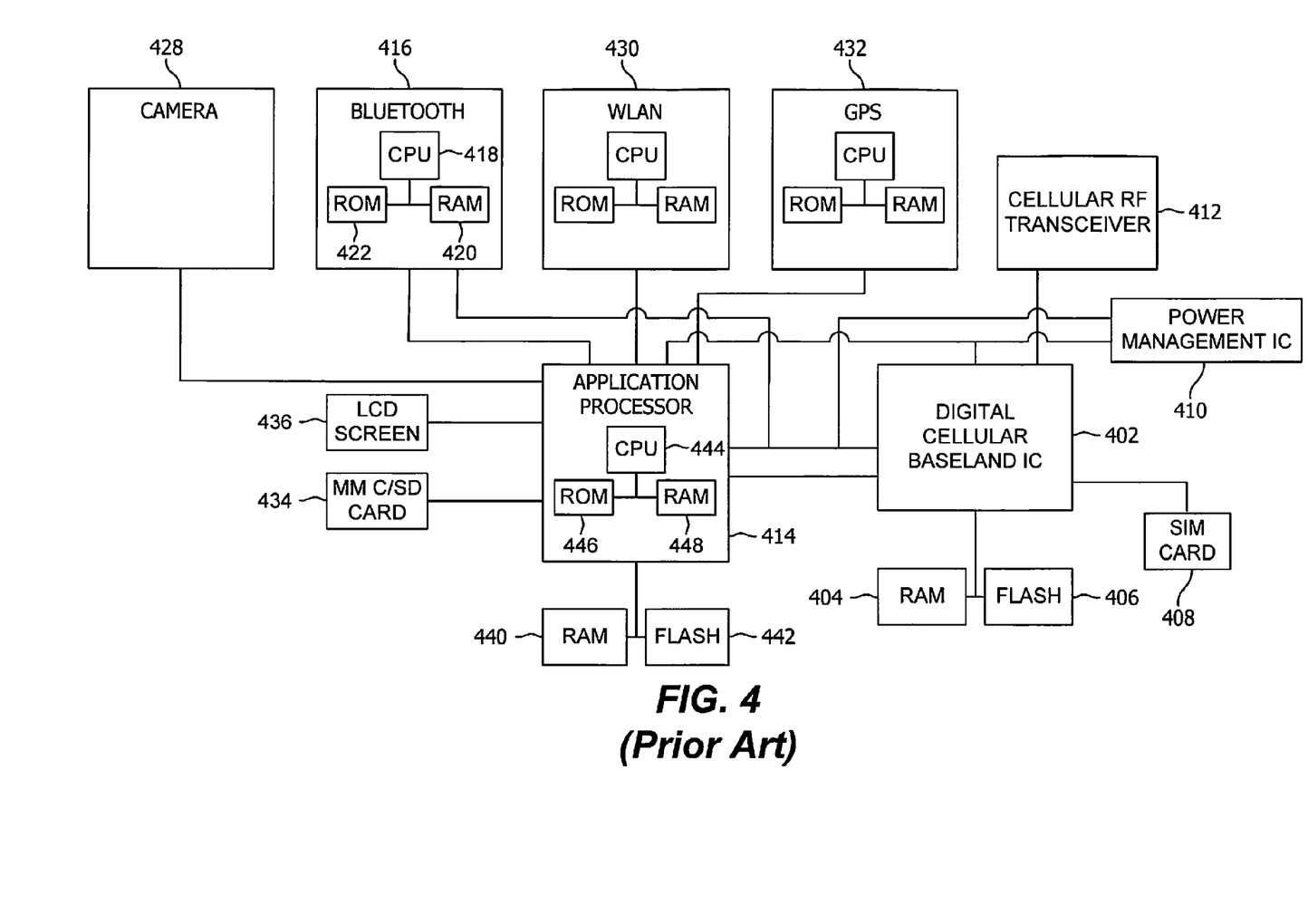
FIGS. 4 provides a high-level block diagram for certain of the internal components of a cell phone.

FIGS. 4 provides a high-level block diagram for certain of the internal components of a cell phone. Referring first to FIG. 4A, these components include a dual-core digital cellular baseband integrated circuit 402, which converts analog radio signals to digital signals and digital signals to analog signals, manages communications-protocol layers, and runs certain cell telephone applications, including applications responsible for initiation of phone-calls and maintenance of a locally-stored phone book, and a portion of the cell-phone user interface. The digital cellular baseband integrated circuit is interconnected with external RAM 404 and flash 406 memory, a subscriber identity module ("SIM"), or SIM card, 408, a power-management integrated circuit 410, a cellular radio-frequency ("RF") transceiver 412, a separate application processor integrated circuit 414, and a Bluetooth module 416 that includes a processor 418 and both RAM 420 and ROM memory 422. The application processor 414 provides the computational bandwidth to a variety of non-radio-communications applications, including digital-camera-based applications, Internet browser, games, networking, and GPS-related functions. An application processor may be connected to a video camera 428, a WLAN module 430, a GPS module 432, an MMC/SD card 434, and an LCD screen 436. The application processor is additionally interconnected with external RAM 440 and flash 442 memory, and includes a processor 444 and internal ROM 446 and RAM 448 memory.

Figure 5:
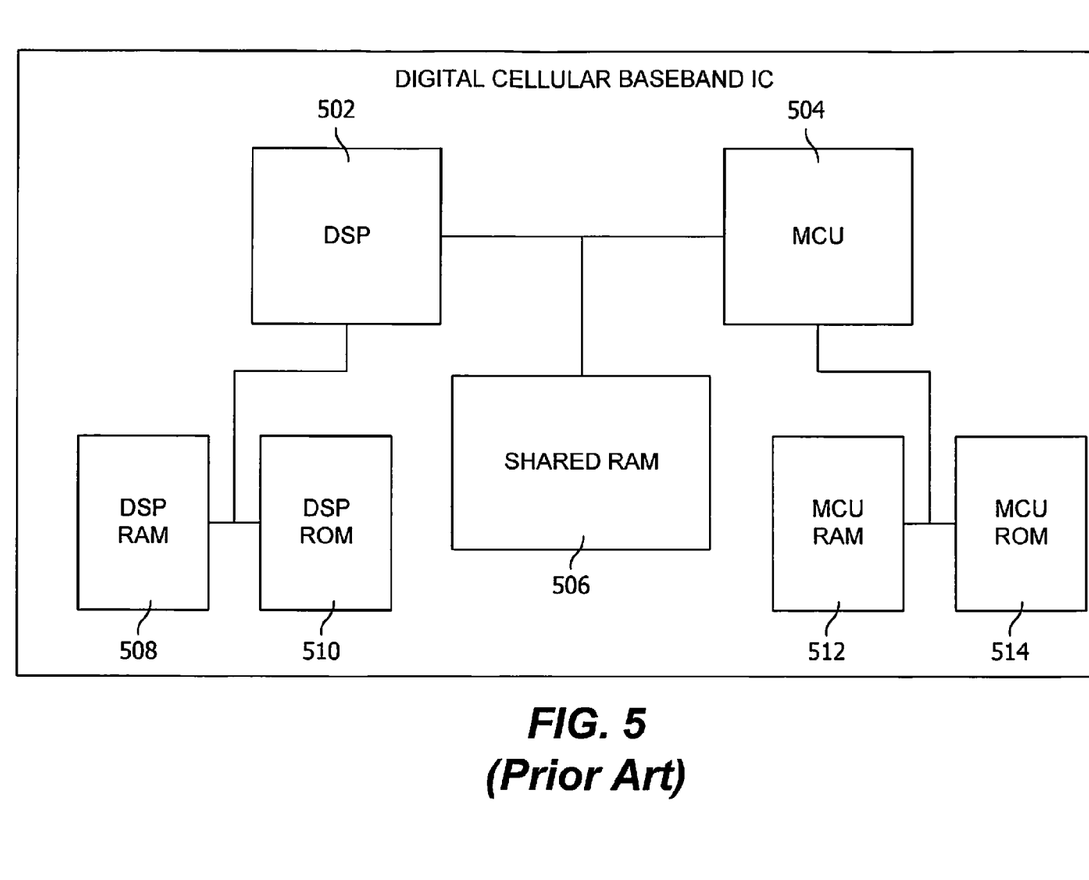
FIG. 5 shows a high-level block diagram for a digital cellular baseband integrated circuit.

FIG. 5 shows a high-level block diagram for a digital cellular baseband integrated circuit. The digital cellular baseband integrated circuit (402 in FIG. 4) includes a digital signal processor ("DSP") 502, a microcontroller 504, shared internal RAM 506, and DSP-associated RAM 508 and ROM 510 as well as microcontroller-associated RAM 512 and ROM 514.

Figure 6:
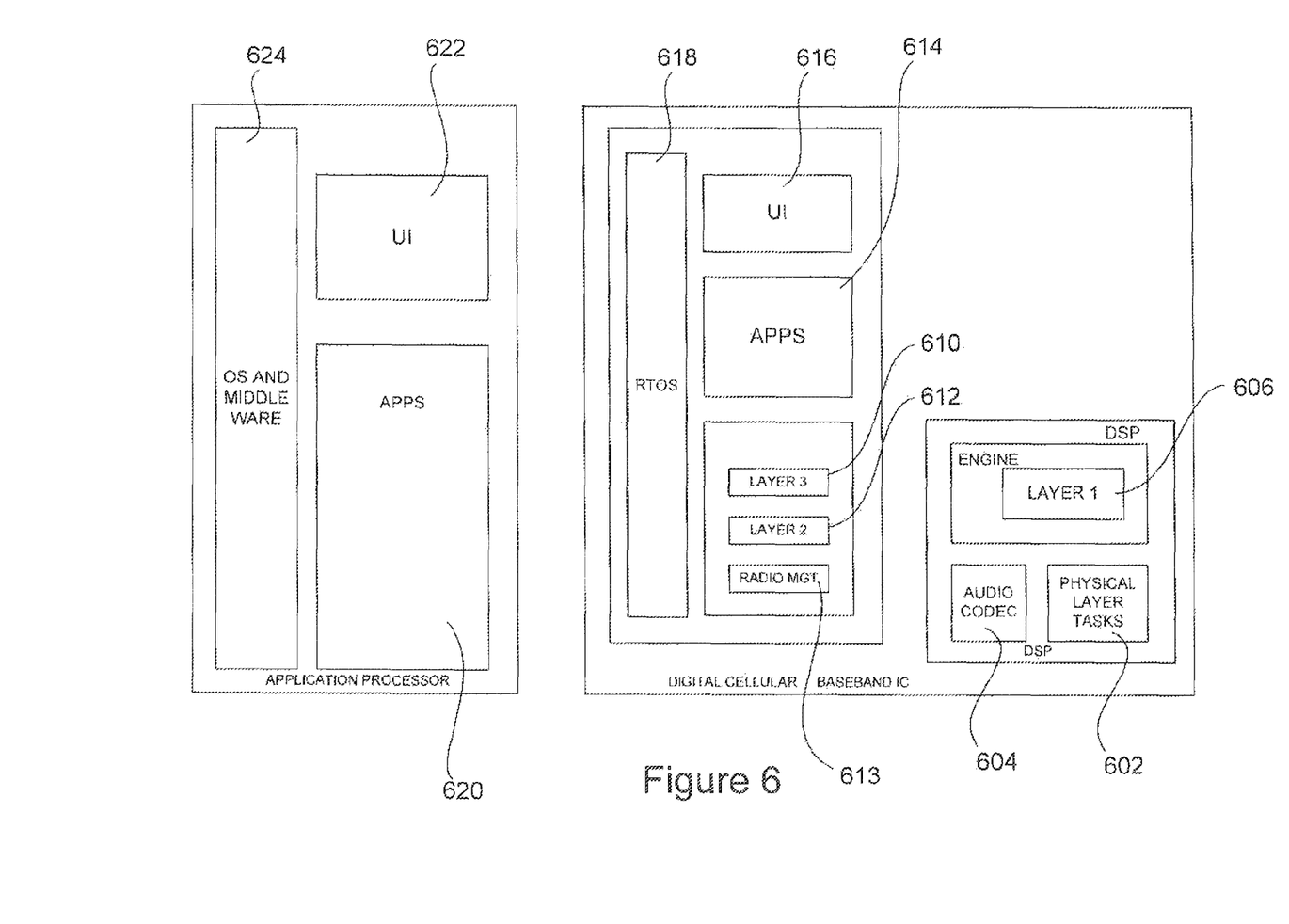
FIG. 6 provides a high-level block diagram of the software architecture for a cellular telephone.

FIG. 6 provides a high-level block diagram of the software architecture for a cellular telephone. The DSP (502 in FIG. 5) is responsible for the physical layer of the protocol stack associated with RF broadcast and reception 602, provides an audio codec 604, and carries out tasks associated with the first layer of a three-layer communications-protocol stack 606. The microcontroller (504 in FIG. 5) executes software that implements the upper two layers of the three-layer protocol stack 610 and 612, various radio-management functions 613, and executes certain applications 614 and user-interface routines 616 layered above a real-time operating system 618. For example, the microcontroller may store and manage a local phone book and provide a user-interface ("UI") for initiating and answering phone calls, via a phone application the executes on the microcontroller. The application processor (414 in FIG. 4) runs numerous software applications 620 and UI routines 622 above an operating system and a middle-ware layer 624.

A cell phone thus generally contains, at a minimum, three processors, including an application processor, microcontroller, and DSP, and often as many as six or more processors, including processors within separate Bluetooth, GPS, and WLAN modules. The cell phone includes various different electronic memories, some integrated with the processors and others external to the processors and interconnected with the processors via memory busses.

Embodiments of the Present Invention

Applications running on the application processor (620 in FIG. 6) of a cell phone often coordinate with a telecommunications application which, in certain cell phones, runs on a digital cellular baseband integrated circuit (614 in FIG. 6) to provide for initiation and management of phone calls. Exemplary applications that run on the application processor of a cell phone may include numerous personal-assistant-type applications, such as calendar applications and database applications that display phone numbers that the user may need to call at particular times, or on a recurrent basis. In certain cell phones, these personal-assistant-type applications transfer phone numbers directly to a cell phone application so that the user can select and initiate a telephone call with a single input to a control key for other user-input feature provided by a personal-assistant-type application or by the cell-phone user interface. Unfortunately, coordination between concurrently executing applications has generally not evolved past transfer of a single phone number.

Figure 7:
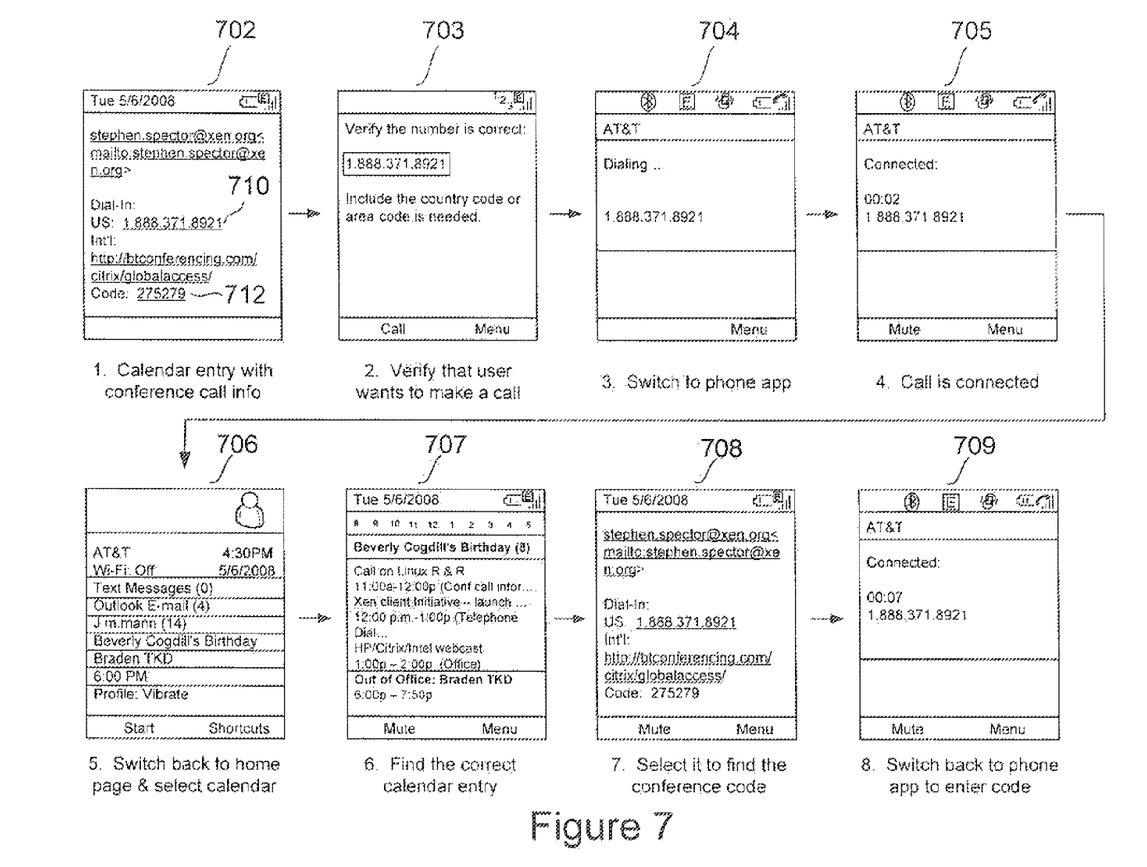
FIG. 7 illustrates exemplary cooperative interaction between concurrently executing applications on a cell phone.

FIG. 7 illustrates exemplary cooperative interaction between concurrently executing applications on a cell phone. FIG. 7 shows a sequence of user-interface ("UI") pages or windows 702-709 displayed to a user during the course of locating information about a conference call and calling into the conference call. The first UI page 702, generated by a calendar application, displays a calendar entry for a teleconference call. The calendar entry includes the telephone number 710 that needs to be called as well as an access code 712 that needs to be input to the conference call after the telephone number is dialed and the access code is automatically requested through the telecommunications network by a conference-call center. The calendar UI or cell-phone UI may support a calling feature that allows the user to direct the conference-call phone to be made. Upon invoking the calling feature, a UI page 703 is displayed, by the calendar application or by another application, in order to verify that the number extracted from the calendar display is, in fact, the correct number to call. Once the user responds affirmatively to the phone-number-verifying UI page 703, the cell-phone application is launched or awakened and the telephone number automatically transferred to the cell-phone application, which then automatically dials the transferred telephone number and concurrently displays UI page 704. When connection is made through the telecommunications system, UI page 705 is then displayed to the user, who concurrently begins to receive audio information through the handset.

At some point, the conference code is requested by an automated voice message broadcast through the telecommunications system to the user. Had the user written down the access code 712, the user could then key the code into the handset in order to proceed to authentication and participation in the conference call. In general, however, the user will have failed to write down the access code, and therefore needs to return to a home page 706 and, from the home page, navigate to the calendar-entry-list display 707 to again find and navigate to the conference-call calendar entry 708. With the access code again displayed, the user can then either memorize the access code or manually write down the access code onto, and then return to the cell-phone application UI 709 to enter the access code and continue participation in the conference call. Needless to say, while automatic input of the phone number from the calendar entry to the phone application provides great convenience to the user, the inability to automatically transfer additional information from the calendar entry to the telephone application results in an awkward and frustrating need to navigate back to the calendar entry and then back again to the cell-phone application, as well as the need for manually recording the access code or other information for subsequent input to the cell-phone application.

Method and system embodiments of the present invention address the awkward and undesirable lack of coordinated information exchange between applications, such as calendar applications, and the cell-phone application, discussed above with reference to FIG. 7, in order to streamline user interaction with multiple, concurrently executing applications on a cell phone or other mobile electronic device.

Figure 8A:
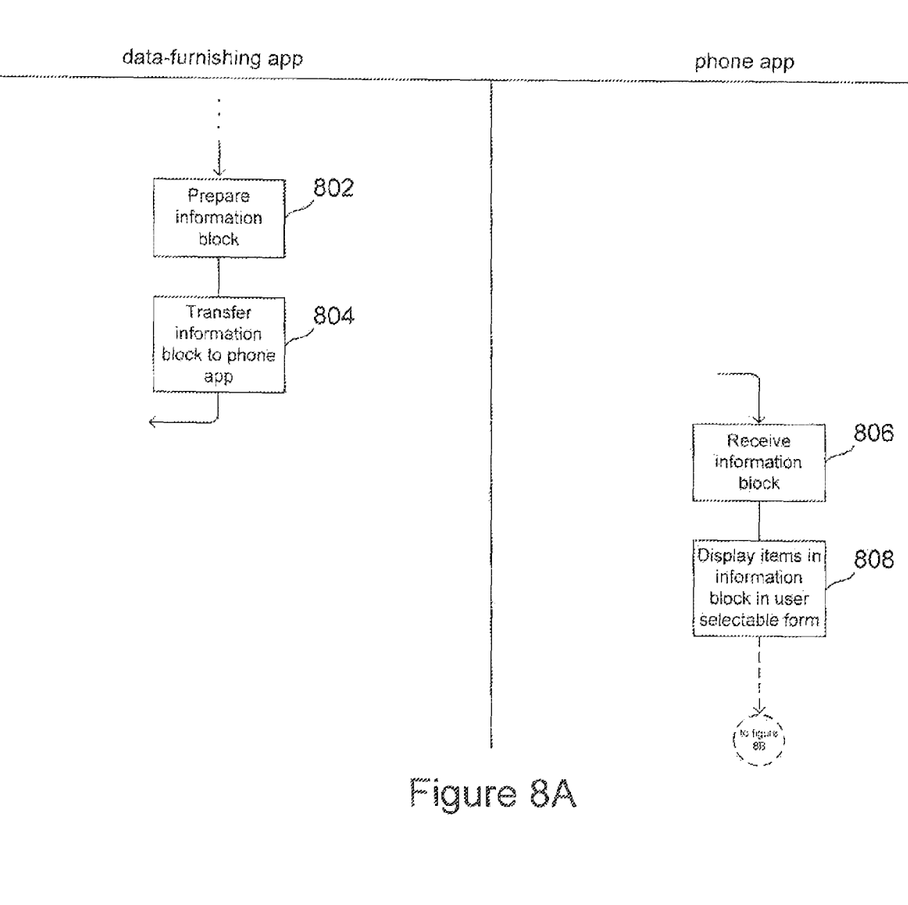
FIGS. 8A-B illustrate information transfer between concurrently executing applications that represent one embodiment of the present invention.
Figure 8B:
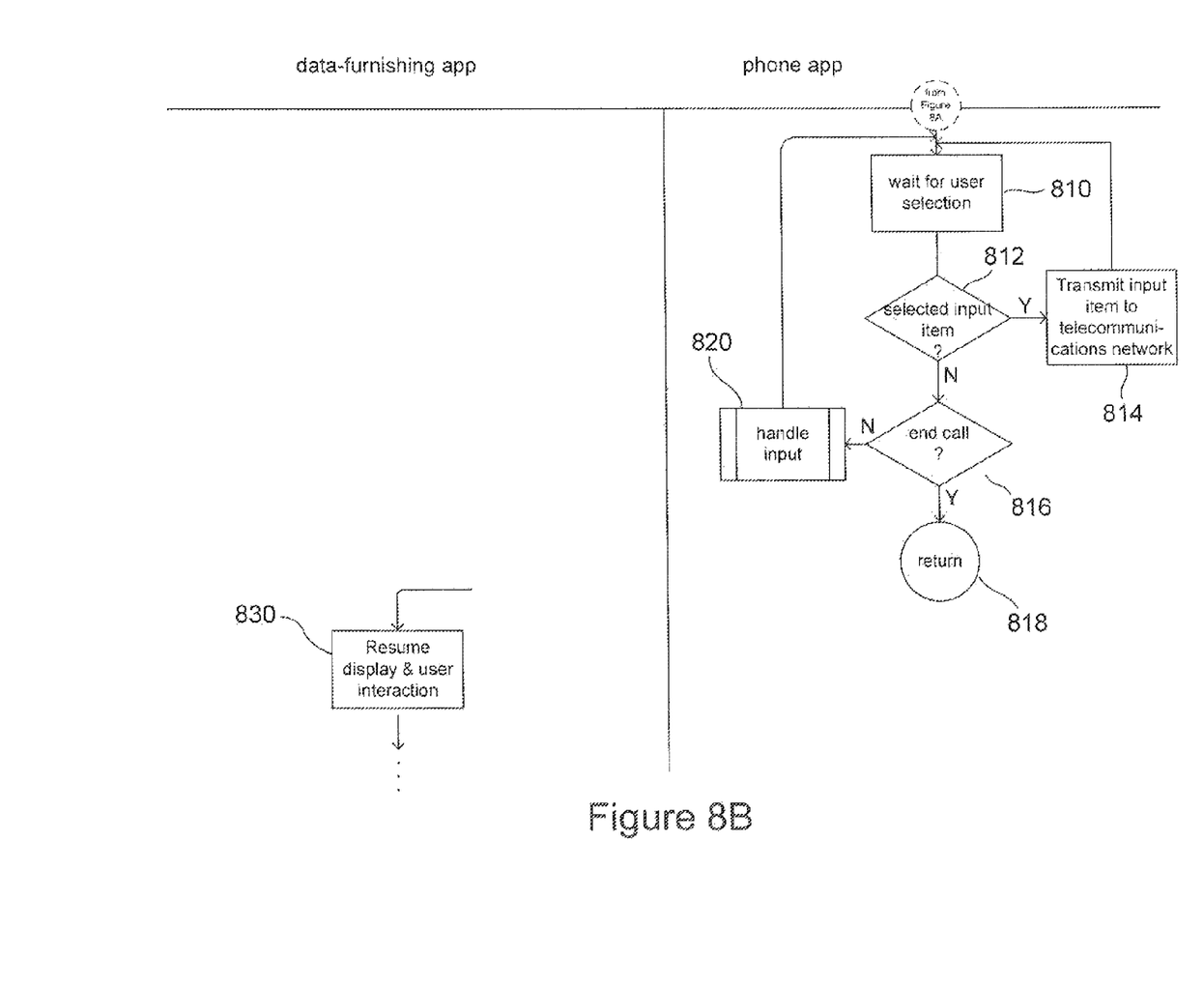

FIGS. 8A-B illustrate information transfer between concurrently executing applications that represent one embodiment of the present invention. Both FIGS. 8A and 8B are divided into two columns, the left-hand column representing execution of a data-furnishing application and the right-hand column representing execution of a cell-phone application to which data is transferred by the data-furnishing application. In FIG. 8A, the data-furnishing application, which may be a database application, a calendar application, a phone book application, or other such application, has been executing up to the point that the application has displayed a UI page to the user that allows the user to launch or awaken the phone application and to automatically transfer a telephone number, displayed on the UI page, from the data-furnishing application to the cell-phone phone application, as discussed above with reference to FIG. 7.

According to the present invention, the data-furnishing application next prepares an information block, in step 802, and transfers the information block to the phone application in step 804. The information block contains one or more information fields, each of which comprises data, generally a stored alphanumeric string, and an alphanumeric tag that identifies the information field and data to the user. The information block is described, in greater detail, below. The data and tags included in the information fields can be obtained by the data-furnishing application in a variety of different ways. The data and tags can be extracted from the displayed UI page or from stored information used to generate the displayed UI page. Alternatively, the data and tags can be programmatically generated, by the data-furnishing application, according to programmed instructions. Alternatively, information-transfer routines may be invoked to parse the UI-display information to extract candidate information fields from the UI page. In yet a further embodiment of the present invention, data-furnishing applications may be written to an information-transfer standard, so that, at each point at which a different UI page is displayed, the data-furnishing applications generate an information block with all potentially useful information fields, including a telephone number to call and store the information block in shared memory or in another location available for access both by the data-furnishing application and the cell-phone application.

Transfer of the information block to the cell-phone application, in step 804, can be carried out through shared memory, by a remote procedure call, or by any of many other information-transfer methods. Following the transfer of the information block to the cell-phone application, the data-furnishing application is suspended while the cell-phone application is launched or awakened. In step 806, the cell-phone application receives the information block and then, in step 808, displays the information fields in a user-selectable format to the user to allow the user to select any particular field, during the course of a phone call, using a control key or other input feature, and transfer the information contained in the information field through the telecommunications network to the remote party to the telephone call. After displaying the information fields, the cell-phone application waits, as shown in step 810 of FIG. 8B, for subsequent user selection. During this time, the user may be exchanging audio information with the remote party to the telephone call. At a subsequent point in time, the user may indicate a desire to transfer information from a displayed information field to the remote party, in which case the cell-phone application discontinues waiting in step 810, and control flows to step 812. In step 812, the cell-phone application determines whether a displayed input item has been selected by the user. When a displayed input item has been selected by the user, then, in step 814, the cell-phone application transfers the alphanumeric text from the displayed information field, using automatic dual-tone-multi-frequency ("DTMF") signal generation, or by another information-transfer means, to the remote party, in step 814. Otherwise, when the user has input an indication to terminate the phone call, as determined in step 816, the cell-phone application suspends itself or terminates, in step 818. Otherwise, what other input may have been generated by the user is handled by a default input handler, in step 820, and control returns to step 810 where the cell-phone application waits for further user input. Once the phone call is completed, the data-furnishing application may resume, in step 830, to resume display of information and receive additional user input.

Figure 9:
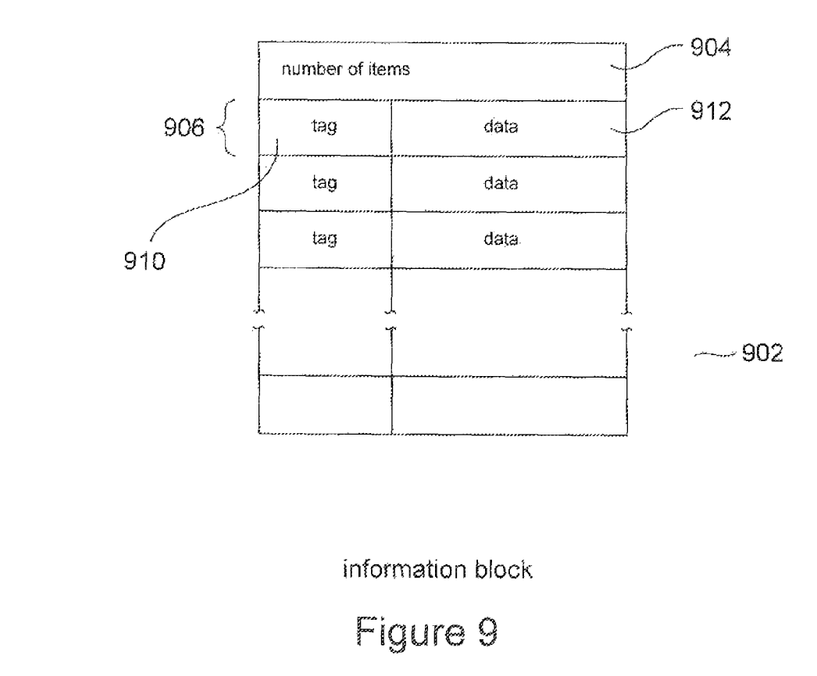
FIG. 9 illustrates an information block for this transfer from a data-furnishing application to the phone application according to embodiments of the present invention.

FIG. 9 illustrates an information block for this transfer from a data-furnishing application to the cell-phone application according to embodiments of the present invention. The information block is essentially a list of fields, headed by an indication of the number of fields in the information block 904. Each field, such as field 906, includes an alphanumeric tag 910 that is displayed to a user to identify the field and data 912, generally an alphanumeric character string that can be transferred from the cell-phone application to a remote party using DTMF tones. In alternative embodiments of the present invention, the data may be a URL or file descriptor that points to a data object for transfer from the cell-phone application to a remote party, including image data objects that may be transferred by fax or by file-transfer protocols.

Figure 10:
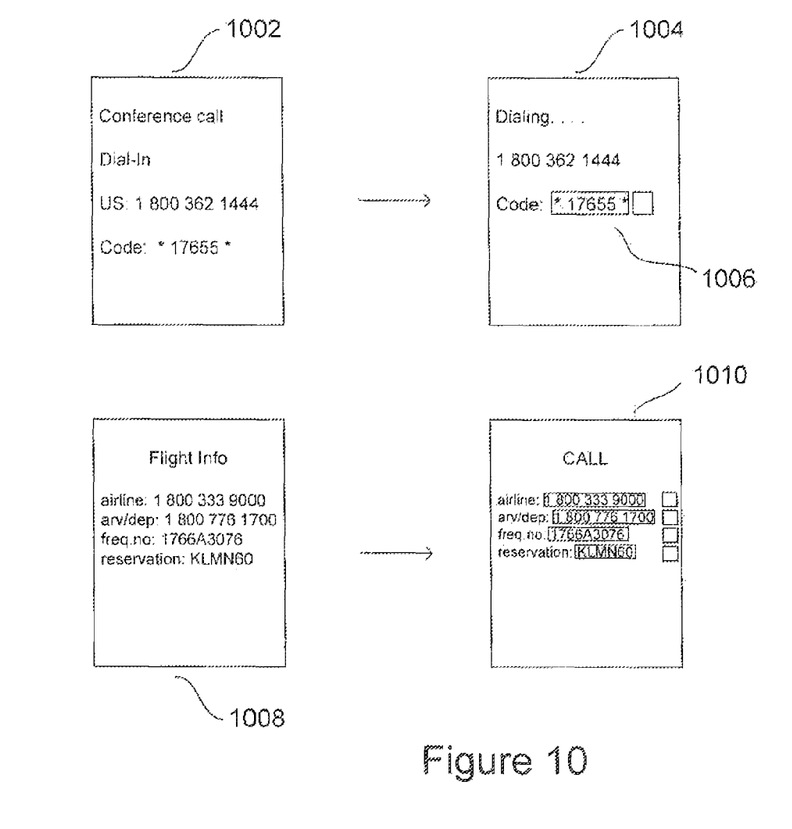
FIG. 10 illustrates portions of several user interactions with cell phone applications made possible by an embodiment of the present invention.

FIG. 10 illustrates portions of several user interactions with cell-phone applications made possible by an embodiment of the present invention. At a point in time when a calendar application has displayed a calendar entry including conference-call information 1002, a user may indicate, through a control key or other user input, that the call should be made, as discussed above with reference to FIG. 7, launching or awakening the cell-phone application which displays user-interface display 1004. However, unlike in the example shown in FIG. 7, the cell-phone application not only automatically dials a conference call number, but also displays the access code 1006 transferred from the calendar application to the cell-phone application in a user information block. Subsequently, the user may input, using control keys or another UI feature, an indication that the access code should be transferred by the cell-phone application to the remote automated conference-call facility. Thus, the user does not need to manually record the access code or navigate back and forth between the calendar application and the cell-phone application. Similarly, a user may have accessed another calendar program, or a database, to find and display information about an upcoming airline flight 1008. At this point, the user may indicate that the cell-phone application should be launched or awakened in order to place a call, resulting in display of the user interface page 1010. The database or calendar program has automatically transferred the displayed information, in an information block, to the cell-phone application. The user can then indicate, using control keys, which of the two phone numbers should be called, and can later transfer a frequent-flyer number and reservation code to a remote airline call center or agent by using one or more control keys or another UI feature. The information displayed to the user by the data-furnishing application is automatically transferred, in an information block, to the cell-phone application, which then re-displays the information and allows the user to direct the information to a remote party during the phone call.

There are many possible alternative embodiments of the present invention. For example, the information block may contain an ordered sequence of information fields, and an additional indication that the information contained in the fields could be processed automatically, in order, by the cell-phone application. As one example, database entry may contain an airplane reservation number, a frequent-flyer number, an additional access code or other number, and that information may be transferred to the cell-phone application, which selects the telephone number as the first data field in the information block, places a call to that number, and then subsequently transfers the additional information fields, in order, to the airline information system once the call is connected. In addition to an ordering of the information, information-block information fields may include additional fields that specify a time interval, following connection, to wait before transferring a particular data item, an indication of how the information is to be transferred, and additional control information.

Although the present invention has been described in terms of particular embodiments, it is not intended that the invention be limited to these embodiments. Modifications will be apparent to those skilled in the art. For example, the data-transfer method and system of the present invention can be implemented in a number of different programming languages for execution on numerous different operating systems, including real-time operating systems, using different control structures, modular organization, data structures, and by varying additional programming parameters. Portions of the method and system may be implemented in logic circuits or firmware. The information block may be a simple, formatted string of bytes stored in electronic memory, or may be alternatively encoded in XML or in a formatted data packet that represents a conventional or standard information-transfer object in particular systems. The information fields may be displayed, by the cell-phone application, for manual user selection, through the user interface, or may be prioritized for automatic use by the cell-phone application, as discussed above.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An information-transfer system that operates within a cell phone, the information-transfer system comprising:
   at least one processor;
   wherein the at least one processor comprises:
   a data-transfer application that, when executed, places information for transfer to a cell-phone application in an information block prior to a user interface being displayed, the data-transfer application configured to cause, based on user selection, a cell-phone application to be executed in order to place a phone call, the information block including a number of information fields each comprising a tag and associated data, at least a portion of the associated data in the information fields being displayed to the user by the data-transfer application; and
   the cell-phone application configured, when executed, to:
   receive the information block;
   display the information fields for selection by a user;
   extract, from the information block, data for transfer to a party of a phone call when a phone call is placed based on user selection of one of the information fields; and
   transfer the extracted data to the party of a phone call when a phone call is placed;
   wherein, the cell-phone application is configured such that when a phone call is placed and when the cell-phone application transfers extracted data to the party of the phone call, the cell-phone application waits for subsequent user selection of another of the information fields, and wherein the cell-phone application is adapted such that, while the cell-phone application waits, the user and the party of the phone call can communicate.

2. The information-transfer system of claim 1 wherein one of the information fields of the information block specifies a time interval to wait before transfer of a particular data item.

3. The information-transfer system of claim 1 wherein the information block is transferred from the data-transfer application to the cell-phone application by one of:
   shared memory; and
   a remote-procedure call.

4. The information-transfer system of claim 1 wherein, upon receiving the information block, the cell-phone application is configured to display the tags and associated data of the information fields to allow a user to select data for transfer.

5. The information-transfer system of claim 1 wherein, upon receiving the information block, the cell-phone application is configured to extract a phone number from the information block and place a telephone call to the extracted phone number.

6. The information-transfer system of claim 1 wherein when a phone call is placed and when the cell-phone application transfers extracted data to a party of the phone call and waits for subsequent user selection, the cell-phone application is configured to extract, from the information block, additional data for transfer to the party of the phone call based on a subsequent user selection of another of the information fields, and is configured to transfer the extracted additional data to the party of the phone call.

7. A method for transferring information between applications within a cell phone, the method comprising:
placing information by a data-transfer application into an information block for transfer to a cell-phone application prior to displaying a user interface, the data-transfer application configured to display a user interface with a call feature and configured to cause, based on user selection, the cell-phone application to be invoked in order to place a phone call, the information block including a number of information fields each comprising a tag and associated data, where at least a portion of the associated data in the information fields is displayed to the user with the data-transfer application;
receiving the information block by the cell-phone application and displaying the information fields for selection by the user;
extracting from the information block, by the cell-phone application, data for transfer to a party of a phone call when a phone call is placed based on user selection of one of the information fields;
when the phone call is placed, transferring, by the cell-phone application, the extracted
data to the party of the phone call; and
waiting, by the cell-phone application, for subsequent user selection of another of the information fields, wherein the user and the party of the phone call can communicate during the waiting.

8. The method of claim 7 wherein one of the information fields of the information block specifies a time interval to wait before transfer of a particular data item.

9. The method of claim 7 further including transferring the information block by the data-transfer application to the cell-phone application by one of:
shared memory; and
a remote-procedure call.

10. The method of claim 7 further including displaying, by the cellphone application, the tags and associated data of the information fields to allow a user to select data for transfer, by the cell-phone application, to the party of a phone call when a phone call is placed.

11. The method of claim 7 further including, upon receiving the information block, extracting a phone number, by the cell-phone application, from the information block and placing a telephone call, by the cell-phone application, to the extracted phone number.

12. The method of claim 7 further including after transferring the extracted data to the party of the phone call and waiting for subsequent user selection, extracting from the information block, by the cell-phone application, additional data for transfer to the party of the phone call based on a subsequent user selection of another of the information fields, and transferring, by the cell-phone application, the extracted additional data to the party of the phone call.

* * * * *